(12) United States Patent
Nagatani

(10) Patent No.: US 8,419,257 B2
(45) Date of Patent: Apr. 16, 2013

(54) DISPLAY APPARATUS AND PLANAR ILLUMINATION APPARATUS

(75) Inventor: Shinpei Nagatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/829,953

(22) Filed: Jul. 2, 2010

(65) Prior Publication Data

US 2011/0007524 A1 Jan. 13, 2011

(30) Foreign Application Priority Data

Jul. 10, 2009 (JP) ................................ P2009-164052

(51) Int. Cl.
 *F21V 8/00* (2006.01)
 *F21V 7/04* (2006.01)
(52) U.S. Cl.
 USPC ............ 362/616; 362/628; 362/619; 362/612
(58) Field of Classification Search .......... 362/606–629; 349/62–68
 See application file for complete search history.

(56) References Cited

U.S. PATENT DOCUMENTS

| 6,241,358 | B1 | 6/2001 | Higuchi et al. | |
|---|---|---|---|---|
| 2004/0239580 | A1* | 12/2004 | Nagatani et al. | 345/1.3 |
| 2009/0002602 | A1* | 1/2009 | Hsu | 349/65 |
| 2010/0214802 | A1* | 8/2010 | Masuda et al. | 362/606 |

FOREIGN PATENT DOCUMENTS

| JP | 57-128383 | | 8/1982 |
|---|---|---|---|
| JP | 11-288611 | | 10/1999 |
| JP | 2002236218 | A * | 8/2002 |
| JP | 2002328631 | A * | 11/2002 |
| JP | 2004303564 | A * | 10/2004 |

* cited by examiner

*Primary Examiner* — Mariceli Santiago
(74) *Attorney, Agent, or Firm* — Finnegan, Henderson, Farabow, Garrett & Dunner LLP

(57) ABSTRACT

A display apparatus is provided which includes a plurality of transparent plates which are disposed to be superimposed and which allow entered light to pass therethrough and allow the light to exit through an exiting surface, light sources provided for the respective transparent plates to irradiate light onto a side end surface of each of the transparent plates, and a plurality of diffusion portions, each of which is formed on a surface of each of the transparent plates facing the exiting surface, and which diffuse light from the light sources such that a position of maximum luminance of light exiting from each of the transparent plates differs between the transparent plates.

8 Claims, 10 Drawing Sheets

DISPLAY APPARATUS AND PLANAR ILLUMINATION APPARATUS

BACKGROUND OF THE INVENTION

1. Field of the Invention

The present invention relates to a display apparatus and a planar illumination apparatus.

2. Description of the Related Art

In recent years, to improve the effective contrast of liquid crystal display apparatuses, in particular, liquid crystal televisions, techniques have been available in which a screen is divided into a plurality of lighting areas and the brightness and darkness of a backlight are controlled according to the location of a lighting area and a display signal. The backlight is a planar illumination apparatus for use in liquid crystal display apparatuses. When the structure of the backlight is of a so-called "direct-lit type" in which light sources are disposed immediately below the display panel, it is difficult to achieve the slimming down of liquid crystal display apparatuses.

On the other hand, when the structure of the backlight is of a so-called "edge-lit type" in which a light guide plate made of a transparent plate and a light source around the light guide plate are disposed, slimming down is facilitated. For example, as shown in Japanese Patent Application Laid-Open No. 57-128383, the edge-lit type backlight is generally configured by a single light guide plate to obtain a single planar illumination light.

SUMMARY OF THE INVENTION

However, in the technique described in Japanese Patent Application Laid-Open No. 57-128383, although a single planar illumination light can be obtained, it may be impossible to divide a screen into a plurality of display areas and control brightness and darkness on a display-area-by-display-area basis. In Japanese Patent Application Laid-Open No. 11-288611 (U.S. Pat. No. 3,373,427), in order to achieve the sliming down of an apparatus and to perform lighting control on an area-by-area basis, an edge-lit type configuration is employed and a plurality of light guide blocks are disposed in a planar tandem configuration.

However, in the technique described in Japanese Patent Application Laid-Open No. 11-288611 (U.S. Pat. No. 3,373,427), since light sources are disposed immediately below a display panel, slimming down is inhibited. In addition, when only a desired area is attempted to be lit up, a light emission distribution results in a rectangular one exhibiting distinct bright and dark contrast and thus does not exhibit a gradual change. Accordingly, when a planar light source apparatus described in Japanese Patent Application Laid-Open No. 11-288611 (U.S. Pat. No. 3,373,427) is applied to a liquid crystal display apparatus, there is an issue that a viewer can see a change in brightness and darkness.

In light of the foregoing, it is desirable to provide a novel and improved display apparatus and planar illumination apparatus that can achieve the sliming down of the apparatuses and can perform lighting on an area-by-area basis while a brightness/darkness distribution exhibits a gradual change.

According to an embodiment of the present invention, there is provided a display apparatus including a plurality of transparent plates which are disposed to be superimposed and which allow entered light to pass therethrough and allow the light to exit through an exiting surface, light sources provided for the respective transparent plates to irradiate light onto a side end surface of each of the transparent plates, and a plurality of diffusion portions, each of which is formed on a surface of each of the transparent plates facing the exiting surface, and which diffuse light from the light sources such that a position of maximum luminance of light exiting from each of the transparent plates differs between the transparent plates.

The display apparatus may further include a reflective member which is disposed adjacent to one of the plurality of diffusion portions disposed on a surface that is most distanced from the exiting surface, and which reflects entered light. The one of the plurality of diffusion portions disposed on the surface that is most distanced from the exiting surface may diffuse light such that the light exits through an area surface of the exiting surface near the light sources.

When light is irradiated onto all the transparent plates from the light sources, light to exit through the exiting surface may be uniform over the entire exiting surface.

The display apparatus may further include a reflector between the transparent plates, the reflector reflecting light so that light from a corresponding one of the light sources which perform irradiation on their corresponding transparent plates does not leak into another transparent plate.

According to an embodiment of the present invention, there is provided a display apparatus including a plurality of transparent plates which are disposed to be superimposed and which allow entered light to pass therethrough and allow the light to exit through an exiting surface, light sources provided for the respective transparent plates to irradiate light onto a side end surface of each of the transparent plates, a plurality of diffusion portions, each of which is formed on a surface of each of the transparent plates facing the exiting surface, and which diffuse light from the light sources, and a control unit that performs lighting control of the light sources such that the light exiting through the exiting surface exits from one or a plurality of areas among a plurality of areas created by dividing the entire exiting surface into a plurality of sections.

According to an embodiment of the present invention, there is provided a display apparatus including a plurality of transparent plates which are disposed to be superimposed and which allow entered light to pass therethrough and allow the light to exit through an exiting surface, light sources provided for the respective transparent plates to irradiate light onto a side end surface of each of the transparent plates, and a plurality of diffusion portions, each of which is formed on a surface of each of the transparent plates facing the exiting surface, and which diffuse light from the light sources. A plurality of linear grooves is formed on one surface or both surfaces of each of the transparent plates in a same direction as a direction in which light from the light sources enters.

A cross-sectional shape of the grooves may be rectangular. The grooves may be formed such that a depth thereof changes according to a distance from the light sources.

According to an embodiment of the present invention, there is provided a display apparatus including a plurality of transparent plates which allow entered light to pass therethrough and allow the light to exit through an exiting surface, light sources provided for the respective transparent plates to irradiate light onto a side end surface of each of the transparent plates, and a plurality of diffusion portions, each of which is formed on a surface of each of the transparent plates facing the exiting surface, and which diffuse light from the light sources such that a position of maximum luminance of light exiting from each of the transparent plates differs between the transparent plates. The light sources are disposed facing each other to irradiate light onto two side end surfaces of each of the transparent plates in a facing relationship, and in each of the diffusion portions, a position of maximum luminance of light exiting from a corresponding transparent plate after light entering from a corresponding light source through one of two side end surfaces is diffused, differs from a position of maximum luminance of light exiting from the corresponding transparent plate after light entering from a corresponding light source through an other one of the two side end surfaces is diffused.

According to an embodiment of the present invention, there is provided a planar illumination apparatus including a plurality of transparent plates which are disposed to be superimposed and which allow entered light to pass therethrough and allow the light to exit through an exiting surface, light sources provided for the respective transparent plates to irradiate light onto a side end surface of each of the transparent plates, and a plurality of diffusion portions, each of which is disposed on a surface of each of the transparent plates facing the exiting surface, and which diffuse light from the light sources such that a position of maximum luminance of light exiting from each of the transparent plates differs between the transparent plates.

According to the embodiments of the present invention described above, the slimming down of apparatuses can be achieved and lighting can be performed on an area-by-area basis while a brightness/darkness distribution exhibits a gradual change.

DETAILED DESCRIPTION OF THE EMBODIMENT(S)

Figure 1:
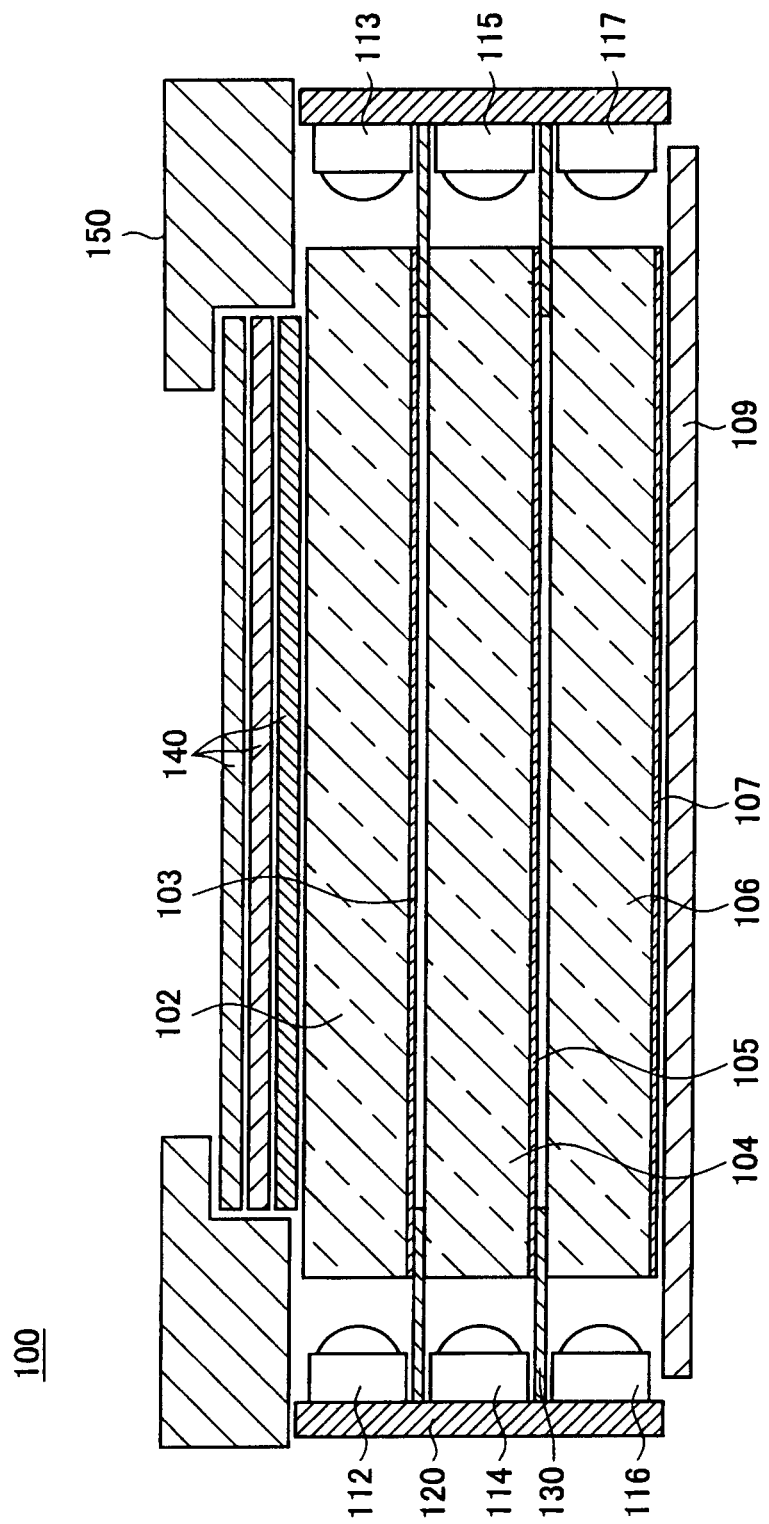
FIG. 1 is a cross-sectional view showing a planar illumination apparatus 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. First embodiment (planar illumination apparatus 100)
2. Second embodiment (liquid crystal display apparatus 200)
3. Third embodiment (grooves 362 of light guide plates 302, 304, and 306)
<1. First Embodiment>
[Configuration of a Planar Illumination Apparatus 100]

Figure 2:
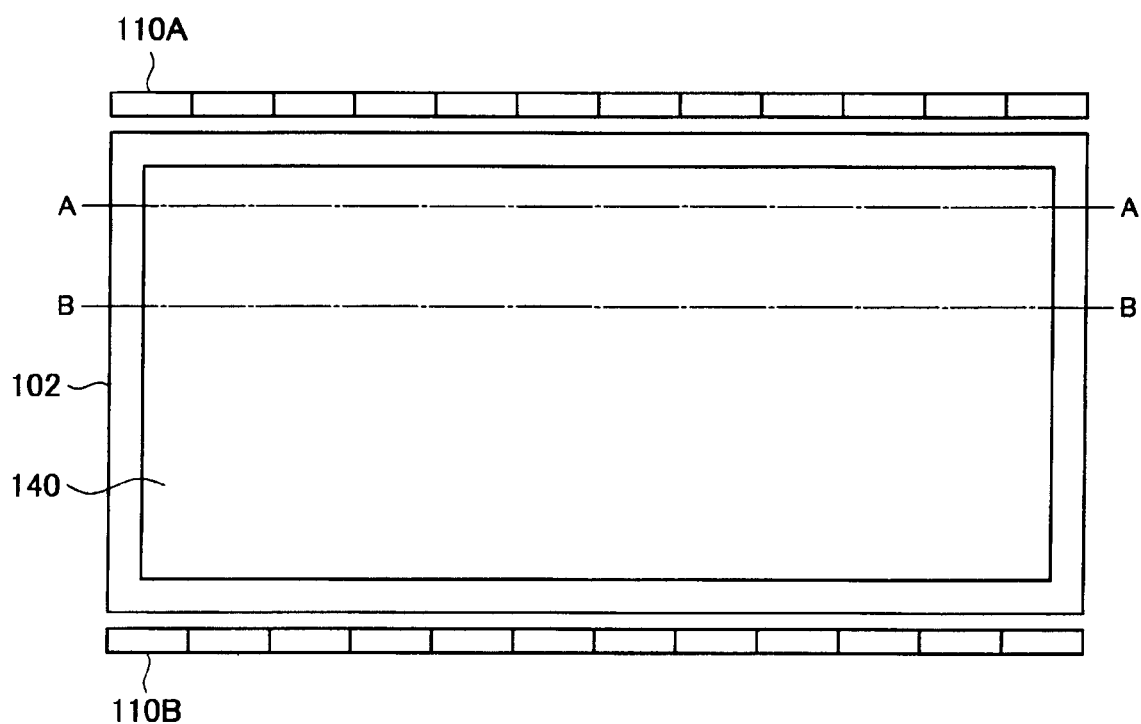
FIG. 2 is a plan view showing the planar illumination apparatus 100 according to the first embodiment and is a view of a light-emitting surface as viewed from the top.

First, with reference to FIGS. 1 and 2, a configuration of a planar illumination apparatus 100 according to a first embodiment of the present invention will be described. FIG. 1 is a cross-sectional view showing the planar illumination apparatus 100 according to the first embodiment of the present invention. FIG. 2 is a plan view showing the planar illumination apparatus 100 according to the present embodiment and is a view of a light-emitting surface as viewed from the top.

The planar illumination apparatus 100 is applied to a liquid crystal display apparatus, etc., such as a liquid crystal television, and irradiates light onto a liquid crystal panel, etc. The planar illumination apparatus 100 includes light guide plates 102, 104, and 106, diffuse reflection patterns 103, 105, and 107, a reflective sheet 109, LED light sources 112, 113, 114, 115, 116, and 117 (hereinafter, also collectively referred to as "LED light sources 110"), wiring boards 120, interlayer reflective sheets 130, optical sheets 140, a frame 150, etc.

The light guide plates 102, 104, and 106 are optical materials having formed therein a means for allowing light that enters from a light source to pass therethrough and scattering or reflecting the light. For the light guide plates 102, 104, and 106, normally used materials can be used. Examples of the materials include polymethyl methacrylate (PMMA) and polycarbonate (PC). The light guide plates 102, 104, and 106 are an example of a transparent plate.

The light guide plates 102, 104, and 106 are flat plates having substantially the same area as a screen of a liquid crystal display apparatus to which the planar illumination apparatus 100 is applied. Each of the light guide plates 102, 104, and 106 has a thickness of, for example, 1.5 mm. The three light guide plates 102, 104, and 106 are disposed on top of one another such that the planes of the light guide plates 102, 104, and 106 are superimposed. Light from the LED light sources 110 enters the side end surfaces of the light guide plates 102, 104, and 106. In the example shown in FIG. 1, the light guide plate 106 is placed on the bottom layer, the light guide plate 104 is disposed on top of the light guide plate 106 as an intermediate layer, and the light guide plate 102 is further disposed on top of the light guide plate 104. Note that a top/bottom relationship as used herein is for when the planar illumination apparatus 100 is disposed as shown in FIG. 1. In the following, a combination of the light guide plates 102, 104, and 106 is referred to as a light guide plate set.

The diffuse reflection patterns 103, 105, and 107 are formed to diffuse and reflect light that enters the light guide plates 102, 104, and 106. As shown in FIG. 1, the diffuse reflection patterns 103, 105, and 107 are formed on a surface of each of the light guide plates 102, 104, and 106, e.g., a surface of each of the light guide plates 102, 104, and 106 facing a light-exiting surface thereof.

As shown in FIGS. 3A to 3C and 4, the diffuse reflection patterns 103, 105, and 107 are formed such that the position of maximum luminance of light exiting from each of the light guide plates 102, 104, and 106 differs between the light guide plates 102, 104, and 106. In addition, the diffuse reflection patterns 103, 105, and 107 are formed such that the position of maximum luminance of light that exits from each of the light guide plates 102, 104, and 106 after each of the light guide plates 102, 104, and 106 diffuses light entering through one of the two side end surfaces thereof, differs from the position of maximum luminance of light that exits from each of the light guide plates 102, 104, and 106 after each of the light guide plates 102, 104, and 106 diffuses light entering through the other side end surface thereof.

The diffuse reflection patterns 103, 105, and 107 are an example of a diffusion portion. The diffuse reflection patterns 103, 105, and 107 will be further described below.

The reflective sheet 109 is provided on a surface facing a light-exiting surface of the light guide plate set through which light exits to the outside. The reflective sheet 109 reflects light entering the light guide plates 102, 104, and 106. In the example shown in FIG. 1, the reflective sheet 109 is provided on the outer side of the surface of the light guide plate 106 where the diffuse reflection pattern 107 is formed.

The LED light sources 110 are light sources of the planar illumination apparatus 100 using LEDs (Light Emitting Diodes). The LED light sources 112, 113, 114, 115, 116, and 117 are placed for each of the light guide plates 102, 104, and 106. The LED light source 112 irradiates one side end surface of the light guide plate 102, and the LED light source 113 irradiates the other side end surface of the light guide plate 102 facing the one side end surface. Likewise, the LED light source 114 irradiates one side end surface of the light guide plate 104, and the LED light source 115 irradiates the other side end surface of the light guide plate 104 facing the one side end surface. The LED light source 116 irradiates one side end surface of the light guide plate 106, and the LED light source 117 irradiates the other side end surface of the light guide plate 106 facing the one side end surface.

The LED light sources 110 are driven by a lighting apparatus which is not shown. The LED light sources 110 are structured such that, as shown in FIG. 2, when viewed from the light-exiting surface (light-emitting surface), the LED light sources 110 are disposed to be divided into a plurality of parts in a horizontal direction of the planar illumination apparatus 100. The LED light sources 110 include: a plurality of LED light source blocks 110A provided on the one side end surface side of the light guide plates 102, 104, and 106; and a plurality of LED light source blocks 110B provided on the other side end surface side of the light guide plates 102, 104, and 106. The LED light source blocks 110A and 110B are divided, as shown in FIG. 1, into three sections in a vertical cross-sectional direction, i.e., three sections, the LED light sources 112, 114, and 116, or three sections, the LED light sources 113, 115, and 117. In addition, as shown in FIG. 2, the LED light source blocks 110A and 110B each include 12 blocks in the horizontal direction.

The wiring boards 120 are boards that mount thereon the LED light sources 112, 113, 114, 115, 116, and 117. The above-described 12 blocks in the horizontal direction of the LED light source blocks 110A and 110B are sections used for lighting control and each wiring board 120 does not need to be divided into 12 sections. For example, each wiring board 120 may be structured in a single unit in the horizontal direction.

The interlayer reflective sheets 130 are disposed near the LED light sources 110 and between the light guide plates 102, 104, and 106. Each interlayer reflective sheet 130 reflects light from a corresponding LED light source 110 so that the light can reliably enter a corresponding one of the light guide plates 102, 104, and 106 in the same layer as the layer in which the corresponding LED light source 110 is placed. Then, the interlayer reflective sheet 130 prevents light from the LED light source 110 from entering any two of the light guide plates 102, 104, and 106 in other layers. Specifically, in FIG. 1, to allow light from the LED light source 112 to efficiently enter the light guide plate 102, a corresponding interlayer reflective sheet 130 reflects light going toward areas other than a side end surface of the light guide plate 102 so that the entrance of light into the side end surface is performed efficiently. For other light guide plates 104 and 106, too, to allow light to efficiently enter the light guide plates 104 and 106, interlayer reflective sheets 130 are disposed between the light guide plates. The interlayer reflective sheets 130 are sheet-like members. The interlayer reflective sheets 130 are an example of a reflector. Note that the interlayer reflective sheets 130 are not limited to sheet-like members and may be plate-like or block-like.

The optical sheets 140 are provided on the light-exiting surface side of the light guide plate set. The example shown in FIG. 1 shows three optical sheets 140 being placed to be superimposed. Each optical sheet 140 may be such that, for example, a scattering material is coated on a transparent resin sheet. The optical sheets 140 are selected to obtain desired characteristics according to various designs, such as the type of the light guide plates 102, 104, and 106 and the type of liquid crystal display apparatus on which the planar illumination apparatus 100 is mounted.

The frame 150 is a member configuring a frame of the planar illumination apparatus 100. Note that in the specification and FIG. 1, a structural member that holds the above-described members, a structural member for placing the planar illumination apparatus 100 in a liquid crystal display apparatus, etc., are not described.

[Diffuse Reflection Patterns 103, 105, and 107]

Figure 3A:
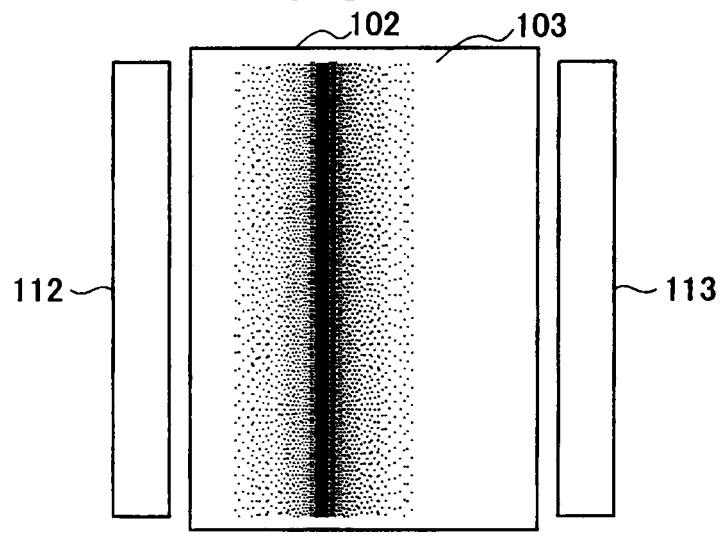
FIGS. 3A to 3C are plan views showing diffuse reflection patterns of the planar illumination apparatus 100 according to the first embodiment.
Figure 3B:
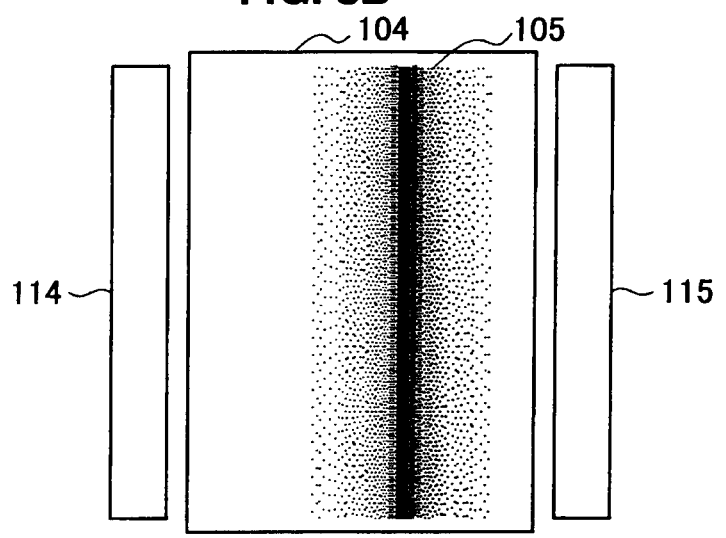
Figure 3C:
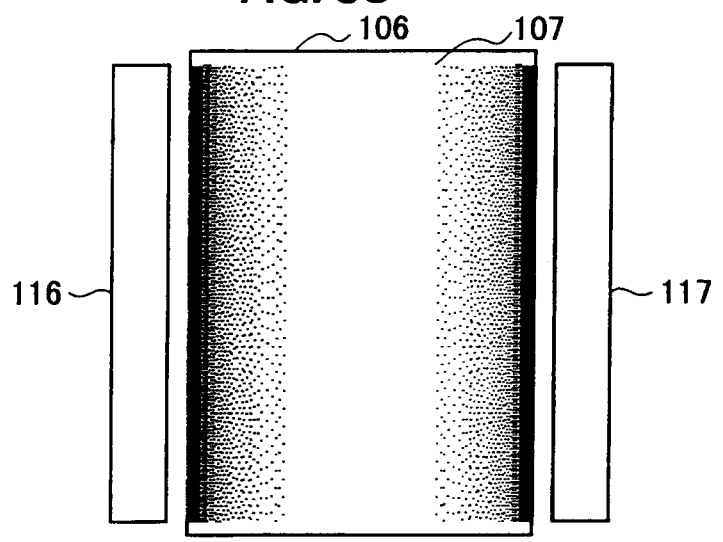
Figure 4:
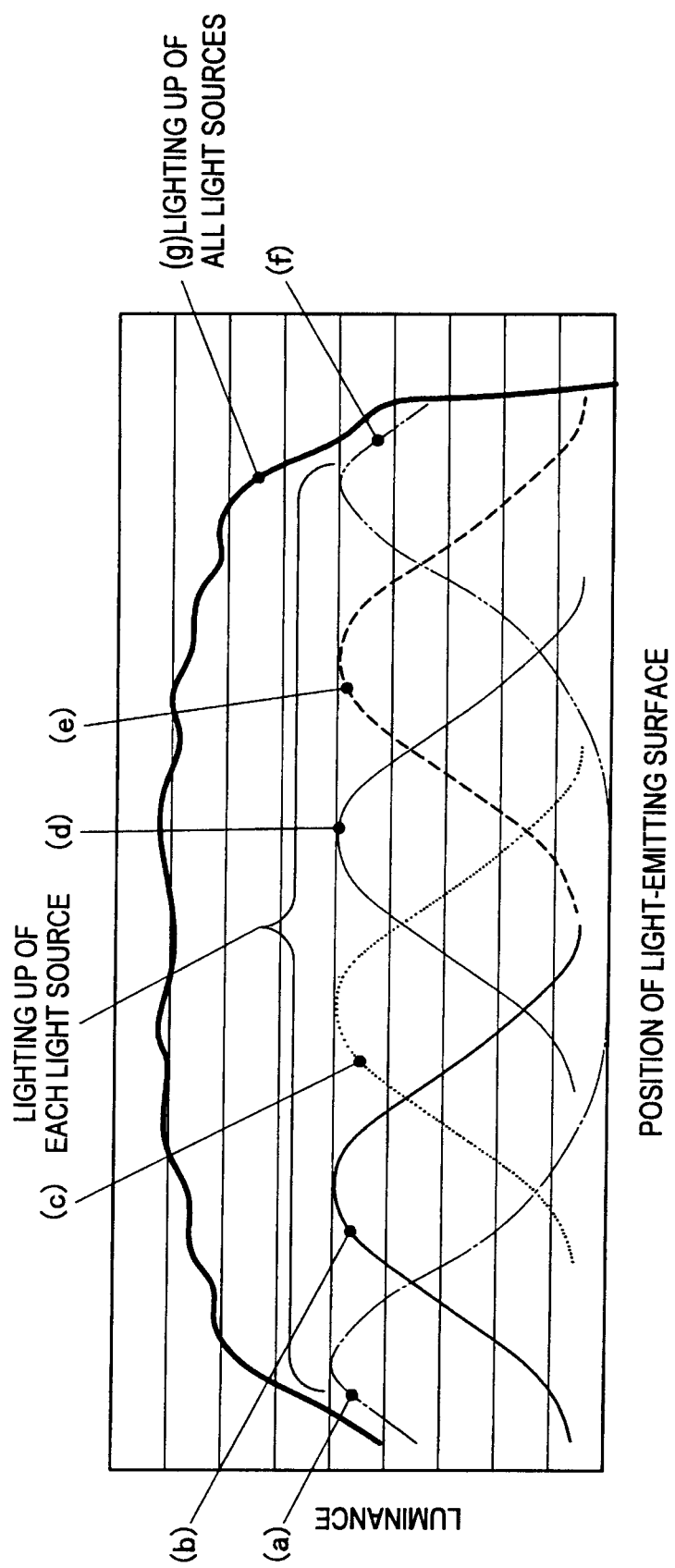
FIG. 4 is a luminance distribution chart showing the light-emitting states of the planar illumination apparatus 100 according to the first embodiment.

Next, with reference to FIGS. 3A to 3C and 4, the diffuse reflection patterns 103, 105, and 107 will be described. FIGS. 3A to 3C are plan views showing diffuse reflection patterns of the planar illumination apparatus 100 according to the present embodiment. FIG. 3A shows the diffuse reflection pattern 103 formed on the light guide plate 102, FIG. 3B shows the diffuse reflection pattern 105 formed on the light guide plate 104, and FIG. 3C shows the diffuse reflection pattern 107 formed on the light guide plate 106. FIG. 4 is a luminance distribution chart showing the light-emitting states of the planar illumination apparatus 100 according to the present embodiment.

The diffuse reflection patterns 103, 105, and 107 have sparse and dense patterns formed therein which are different for different layers in which they are placed. Sparse and dense patterns can be formed by various methods. For example, a sparse and dense pattern is formed by being printed on a surface of each of the light guide plates 102, 104, and 106 using silica ink, etc. As shown in FIGS. 3A to 3C, in the diffuse reflection patterns 103, 105, and 107, a dark portion and a light portion gradually change. In a dark color portion, scattering of light is strong and thus luminance on the exiting surface is high. In contrast, in a light color portion, scattering of light is weak and thus luminance on the exiting surface is relatively low. The diffuse reflection patterns 103, 105, and 107 may be formed on the entire surface of each of the light guide plates 102, 104, and 106 or may be formed only on a part of the surface of each of the light guide plates 102, 104, and 106.

By forming the diffuse reflection patterns 103, 105, and 107 in the above-described manner, the peak shape of a luminance distribution on the exiting surface can be controlled according to the positional relationship between the LED light sources 110. When the planar illumination apparatus 100 lights up the LED light source 112 shown in FIG. 3A, the planar illumination apparatus 100 produces a luminance distribution indicated by (b) in FIG. 4. When the planar illumination apparatus 100 lights up the LED light source 113 shown in FIG. 3A, the planar illumination apparatus 100 produces a luminance distribution indicated by (d) in FIG. 4. Likewise, when the planar illumination apparatus 100 lights up the LED light source 114 shown in FIG. 3B, the planar illumination apparatus 100 produces a luminance distribution indicated by (c) in FIG. 4. When the planar illumination apparatus 100 lights up the LED light source 115 shown in FIG. 3B, the planar illumination apparatus 100 produces a luminance distribution indicated by (e) in FIG. 4. When the planar illumination apparatus 100 lights up the LED light source 116 shown in FIG. 3C, the planar illumination apparatus 100 produces a luminance distribution indicated by (a) in FIG. 4. When the planar illumination apparatus 100 lights up the LED light source 117 shown in FIG. 3C, the planar illumination apparatus 100 produces a luminance distribution indicated by (f) in FIG. 4.

When the planar illumination apparatus 100 lights up all the LED light sources 112, 113, 114, 115, 116, and 117, the planar illumination apparatus 100 produces a luminance distribution indicated by (g) in FIG. 4. As a result, a desired light emission luminance can be obtained over the entire exiting surface. The desired light emission luminance is, for example, uniform luminance over the entire exiting surface.

The sparse and dense patterns of the diffuse reflection patterns 103, 105, and 107 are formed such that, as shown by (a) to (f) in FIG. 4, the peaks of the luminance distributions are evenly spaced.

The diffuse reflection pattern 107 produces peaks of luminance distributions near its corresponding LED light sources 110, such as those shown by (a) and (f) in FIG. 4. The light guide plate 106 having formed thereon the diffuse reflection pattern 107 may be disposed in a position closest of all the plurality of light guide plates to the reflective sheet 109. In light from the LED light sources 116 and 117 having luminance distributions such as those shown by (a) and (f) in FIG. 4, unlike other luminance distributions (b) to (e) in FIG. 4, when the maximum luminances of the light are compared with those of other luminance distributions (b) to (e), the amounts of light and corresponding light-emitting areas differ. Due to this, afterglow is produced, making it difficult to unify the luminance distributions. Meanwhile, since the plurality of light guide plates are superimposed, light from LED light sources in the bottom layer is likely to be weakened and thus darkened. Accordingly, the light guide plate 106 having formed thereon the diffuse reflection pattern 107 is placed near the reflective sheet 109 so as to obtain equal luminance distributions regardless of the positions of (a) to (f).

Note that for each one type of diffuse reflection patterns shown in FIGS. 3A to 3C two luminance distributions are obtained. This is because the sparse and dense characteristics of the diffuse reflection patterns can control luminance distributions. A sparse and dense pattern is formed such that two luminance distributions can be formed by one diffuse reflection pattern. For example, a sparse and dense distribution of a diffuse reflection pattern is formed such that a luminance distribution obtained by one side of the LED light source blocks 110A differs from a luminance distribution obtained by the other side of the LED light source blocks 110B, with a peak of the sparse and dense distribution being the center of the difference.

[Lighting Control of the Planar Illumination Apparatus 100]

Figure 5:
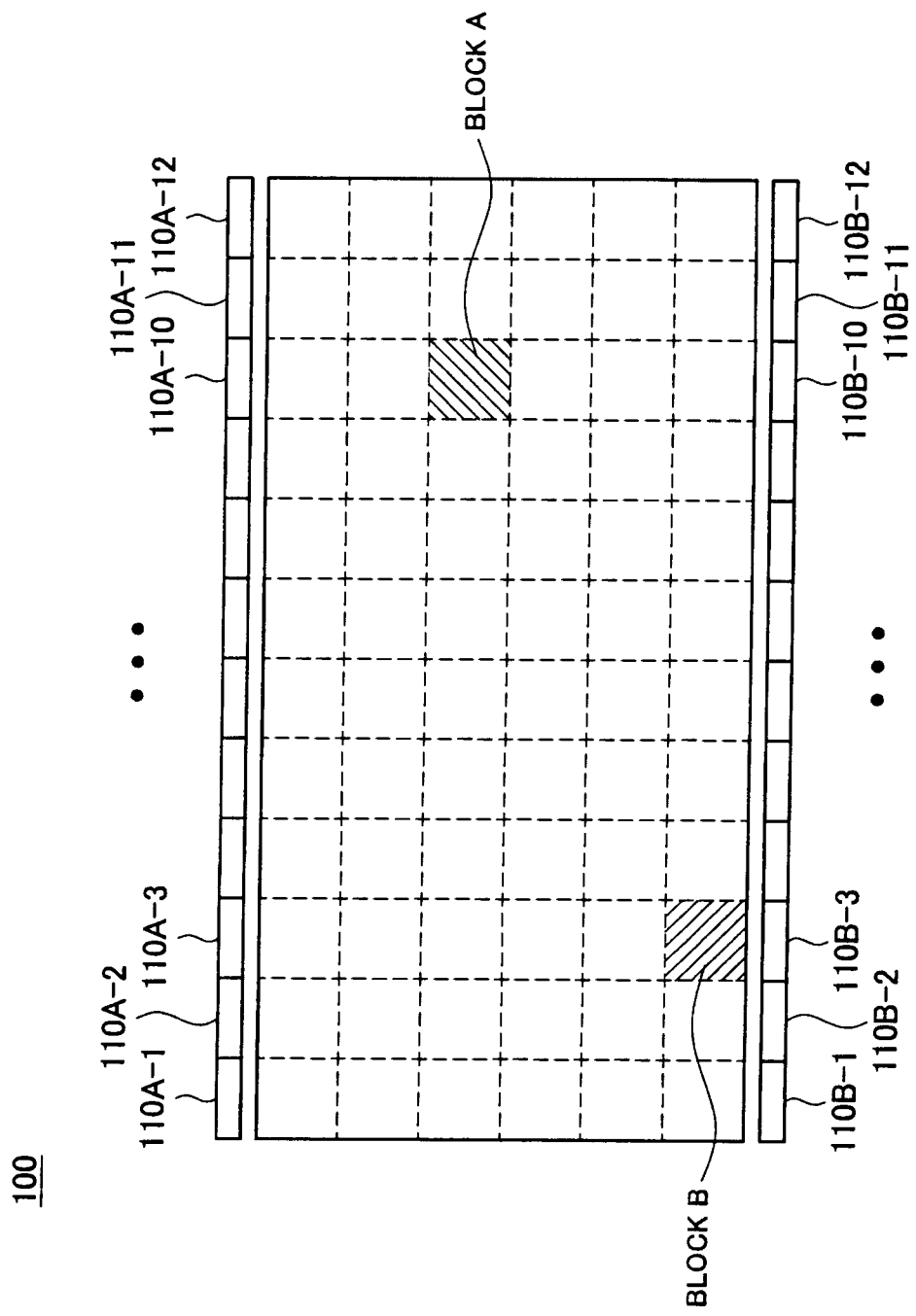
FIG. 5 is a plan view showing the planar illumination apparatus 100 according to the first embodiment and is an illustrative view showing light emission control.

Next, lighting control of the planar illumination apparatus 100 according to the present embodiment will be described. FIG. 5 is a plan view showing the planar illumination apparatus 100 according to the present embodiment and is an illustrative view showing light emission control.

The planar illumination apparatus 100 according to the present embodiment includes a control unit. The control unit is implemented by, for example, a CPU, etc. The control unit can perform lighting drive of the LED light sources 110 according to content data, a broadcast signal of a program, etc., to brighten or darken the screen of the planar illumination apparatus 100 having a plurality of lighting areas, on a lighting-area-by-lighting-area basis. For a method for controlling the LED light sources 110 according to content data, a broadcast signal of a program, etc., there is a method in which an area with high luminance in content or a program is lit up to display the area brightly and in contrast an area with low luminance is not lit up to display the area darkly.

For example, to light up a block A in FIG. 5, the control unit performs lighting drive of the LED light source 114 which is placed on an intermediate layer of an LED light source block 110A-10. To light up a block B in FIG. 5, the control unit performs lighting drive of the LED light source 117 which is placed on a bottom layer of an LED light source block 110B-3. Likewise, to perform lighting on a screen-area-by-screen-area basis, by controlling lighting of the LED light sources 110, brightness and darkness of lighting can be controlled. Furthermore, to light up the entire screen area, the control unit performs lighting drive of all the LED light sources 110.

As described above, according to the present embodiment, since the LED light sources 110 are provided in positions where the side end surfaces of the light guide plates 102, 104, and 106 are irradiated, the slimming down of a liquid crystal display apparatus and the planar illumination apparatus 100 can be achieved. In addition, the light guide plates 102, 104, and 106 are flat plates having substantially the same area as a screen of a liquid crystal display apparatus. The plurality of diffuse reflection patterns 103, 105, and 107 are provided which diffuse light such that the position of maximum luminance of light exiting from each of the light guide plates 102, 104, and 106 differs between the light guide plates 102, 104, and 106. As a result, the planar illumination apparatus 100 can perform lighting on an area-by-area basis while a brightness/darkness distribution exhibits a gradual change.

<2. Second Embodiment>

Figure 6:
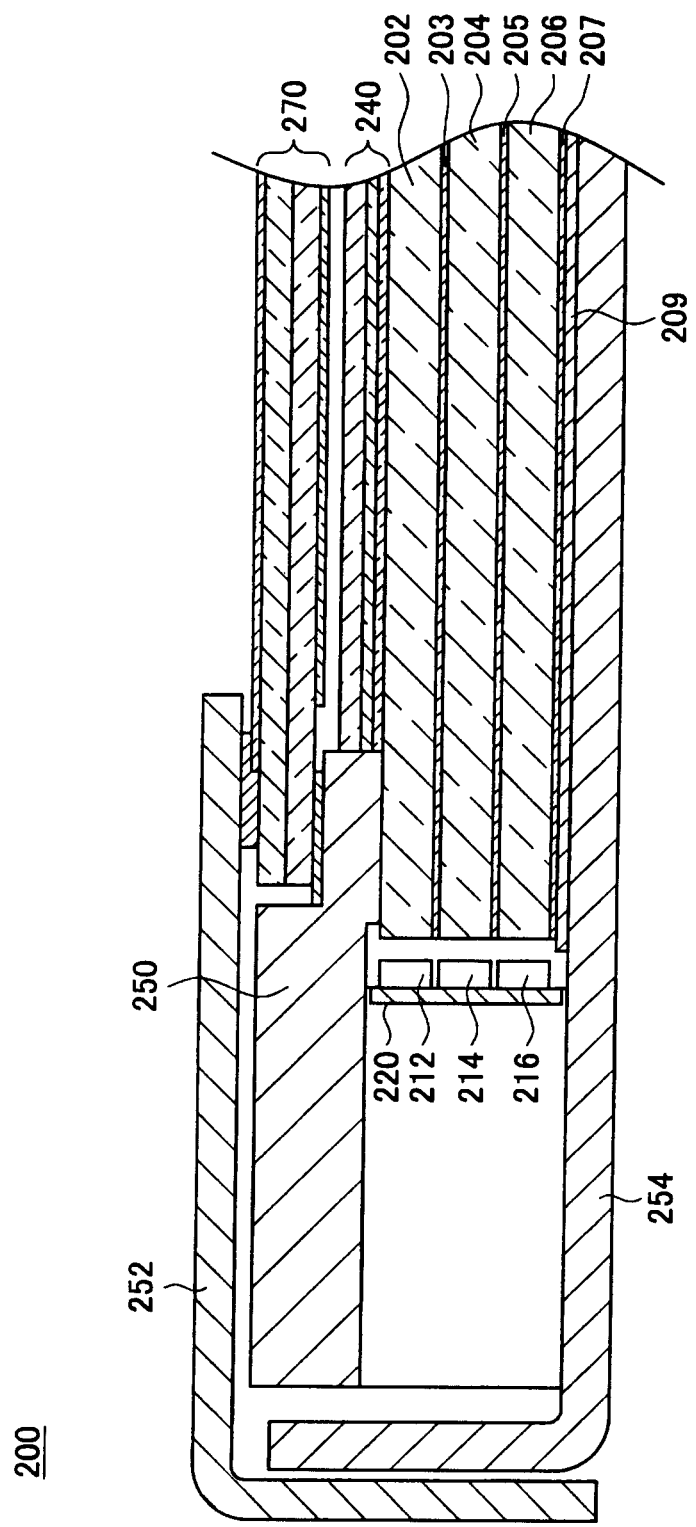
FIG. 6 is a partially enlarged cross-sectional view showing a liquid crystal display apparatus 200 according to a second embodiment of the present invention.

Next, a liquid crystal display apparatus 200 according to a second embodiment of the present invention will be described. FIG. 6 is a partially enlarged cross-sectional view showing the liquid crystal display apparatus 200 according to the present embodiment. The liquid crystal display apparatus 200 is a display apparatus having placed therein a planar illumination apparatus such as that described in the first embodiment.

The liquid crystal display apparatus 200 includes light guide plates 202, 204, and 206, diffuse reflection patterns 203, 205, and 207, a reflective sheet 209, LED light sources 212, 214, and 216, a wiring board 220, optical sheets 240, a frame 250, a bezel 252, a chassis 254, a liquid crystal panel 270, etc.

The light guide plates 202, 204, and 206, the diffuse reflection patterns 203, 205, and 207, the reflective sheet 209, the LED light sources 212, 214, and 216, the wiring board 220, the optical sheets 240, and the frame 250 correspond to their respective corresponding members described in the first embodiment. The light guide plates 202, 204, and 206, the diffuse reflection patterns 203, 205, and 207, the reflective sheet 209, the LED light sources 212, 214, and 216, the wiring board 220, the optical sheets 240, and the frame 250 configure a planar illumination apparatus. For LED light sources, although the LED light sources 212, 214, and 216 which are provided on one end side of the light guide plates 202, 204, and 206 are shown, as in the first embodiment, LED light sources are provided on the other end side of the light guide plates 202, 204, and 206, too.

The liquid crystal panel 270 is placed on the exiting surface side of the planar illumination apparatus which includes the light guide plates 202, 204, and 206, etc. Light is irradiated onto the liquid crystal panel 270 from the planar illumination apparatus. Then, an image having become visible by light having passed through the liquid crystal panel 270 is displayed on the viewer side. For a method for driving the liquid crystal panel 270, any of a TN (Twisted Nematic) method, a VA (Vertical Alignment) method, an IPS (In-Plane Switching) method, etc., may be used.

A video signal for content or a program is applied to the liquid crystal panel 270. The liquid crystal display apparatus 200 is provided with a control unit that performs lighting drive of the LED light sources of the planar illumination apparatus in synchronization with the application timing of a video signal applied to the liquid crystal panel 270.

The planar illumination apparatus including the light guide plates 202, 204, 206, etc., and the liquid crystal panel 270 are included and fixed in the bezel 252 and the chassis 254.

The liquid crystal display apparatus 200 according to the present embodiment can control the LED light sources according to content data, a broadcast signal of a program, etc., to, for example, light up an area with high luminance in content or the program to display the area brightly or, in contrast, not to light up an area with low luminance to display the area darkly.

According to the present embodiment, since the LED light sources are provided in positions where the side end surfaces of the light guide plates 202, 204, and 206 are irradiated, the slimming down of the liquid crystal display apparatus 200 can be achieved. In addition, the light guide plates 202, 204, and 206 are flat plates having substantially the same area as a screen of the liquid crystal display apparatus 200. The plurality of diffuse reflection patterns 203, 205, and 207 are provided which diffuse light such that the position of maximum luminance of light exiting from each of the light guide plates 202, 204, and 206 differs between the light guide plates 202, 204, and 206. As a result, the liquid crystal display apparatus 200 can perform lighting on an area-by-area basis while a brightness/darkness distribution exhibits a gradual change.

<3. Third Embodiment>

Figure 7A:
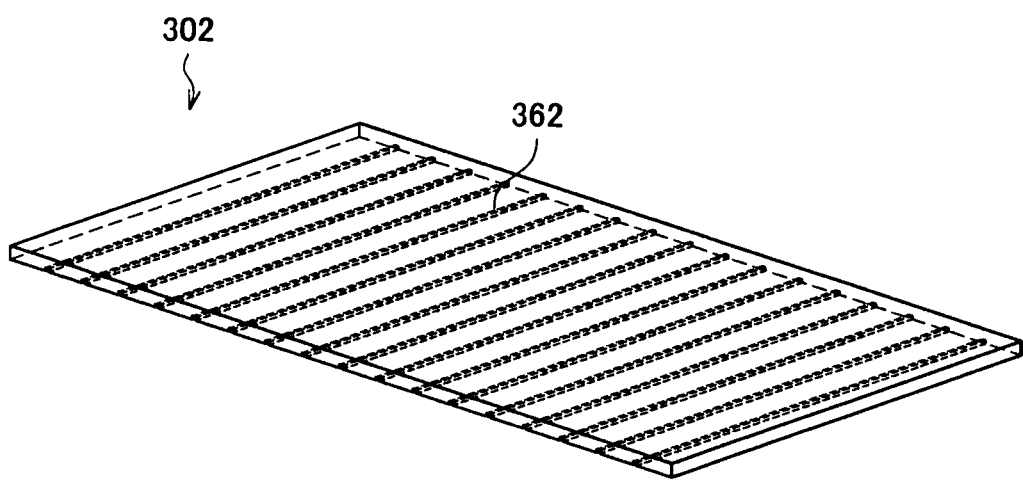
FIG. 7A is a perspective view showing a light guide plate 302 of a planar illumination apparatus 300 according to a third embodiment of the present invention.
Figure 7B:
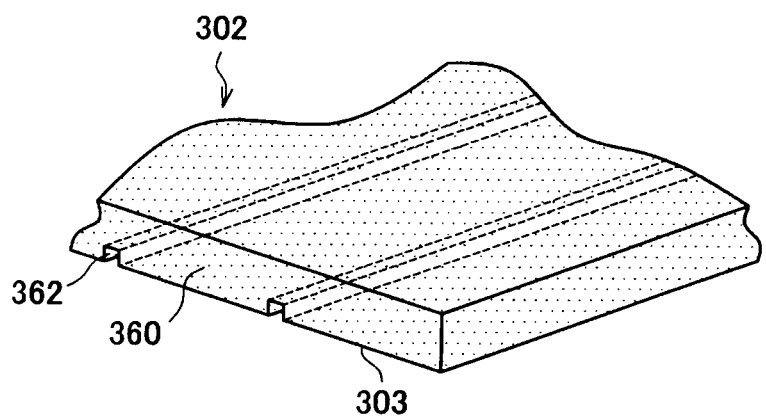
FIG. 7B is a partially enlarged perspective view of FIG. 7A.
Figure 8:
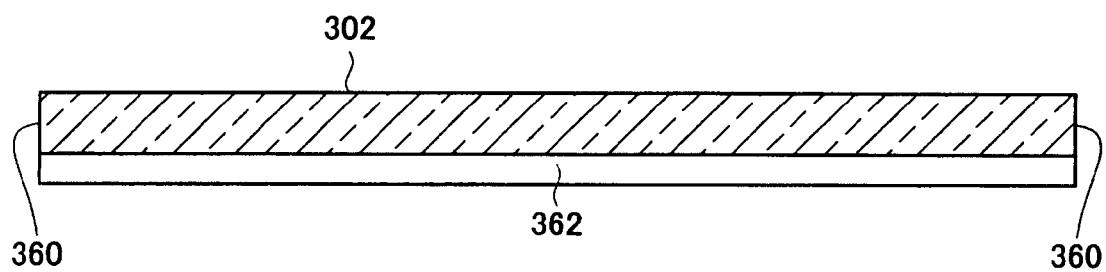
FIG. 8 is a cross-sectional view showing the light guide plate 302 of the planar illumination apparatus 300 according to the third embodiment.
Figure 12A:
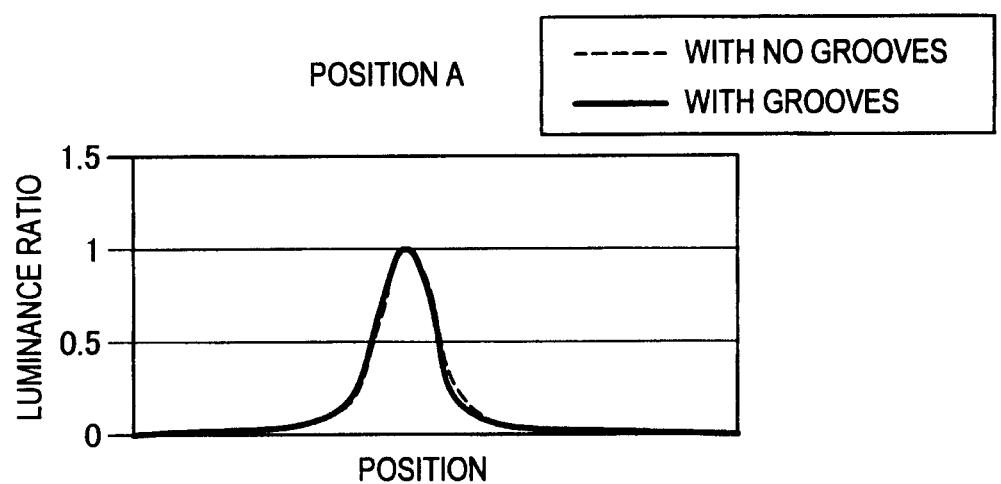
FIGS. 12A and 12B are luminance distribution charts showing light-emitting states in certain positions of the planar illumination apparatuses 100 and 300 according to the first and third embodiments of the present invention.
Figure 12B:
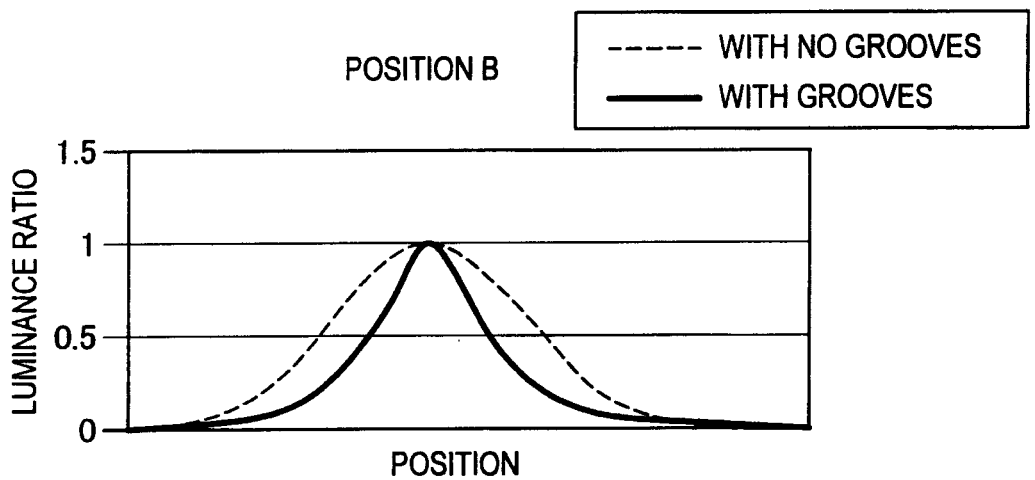

Next, a planar illumination apparatus 300 according to a third embodiment of the present invention will be described. FIG. 7A is a perspective view showing a light guide plate 302 of the planar illumination apparatus 300 according to the third embodiment of the present invention. FIG. 7B is a partially enlarged perspective view of FIG. 7A. FIG. 8 is a cross-sectional view showing the light guide plate 302 of the planar illumination apparatus 300 according to the present embodiment. FIGS. 12A and 12B are luminance distribution charts showing light-emitting states in certain positions of the planar illumination apparatuses 100 and 300 according to the first and third embodiments of the present invention. FIG. 12A is a luminance distribution chart showing a light-emitting state in a certain position on line A-A in FIG. 2. FIG. 12B is a luminance distribution chart showing a light-emitting state in a certain position on line B-B in FIG. 2.

The planar illumination apparatus 300 is applied to a liquid crystal display apparatus, etc., such as a liquid crystal television, and irradiates light onto a liquid crystal panel, etc. The planar illumination apparatus 300 includes light guide plates, diffuse reflection patterns, a reflective sheet, LED light sources, wiring boards, interlayer reflective sheets, optical sheets, a frame, etc. The planar illumination apparatus 300 according to the third embodiment differs from the planar illumination apparatus 100 according to the first embodiment in the configuration of the light guide plates. The configurations and functions of other members are the same as those in the first embodiment and thus a detailed description thereof will not be repeated.

In the above-described first embodiment, the diffuse reflection patterns 103, 105, and 107 are formed on a surface of each of the light guide plates 102, 104, and 106, i.e., a surface of each of the light guide plates 102, 104, and 106 facing a light-exiting surface thereof. In the third embodiment, a plurality of grooves 362 are formed on a surface of each of light guide plates 302, 304, and 306, e.g., a surface of each of the light guide plates 302, 304, and 306 facing a light-exiting surface thereof and having formed thereon a diffuse reflection pattern 303, 305, or 307.

As shown in FIGS. 7A and 7B, the grooves 362 are formed in the same direction as a direction in which LED light sources 110 irradiate. A side end surface 360 shown in FIG. 7B is a surface through which light from a corresponding LED light source 110 enters. The grooves 362 are formed in a direction perpendicular to the side end surface 306. When the thickness of the light guide plates 302, 304, and 306 is t, the grooves 362 have, for example, a width of 0.3 t and a depth of 0.3 t.

When grooves are not formed, as in the case of the light guide plates 102, 104, and 106 in the first embodiment, the range in which light irradiated from the LED light sources 110 is diffused inside the light guide plates 102, 104, and 106 increases as the light goes farther away from the entering surface. Accordingly, as shown in FIGS. 12A and 12B, light is diffused when going away from the entering surface. As a result, a difference occurs in luminance distribution from the exiting surface, depending on the positions of the exiting surfaces of the light guide plates 302, 304, and 306.

On the other hand, in the third embodiment, walls which are formed inside the light guide plates 302, 304, and 306 by the grooves 362 reflect light. Hence, by forming the plurality of grooves 362 in the light guide plates 302, 304, and 306, even if light irradiated from the LED light sources 110 goes away from the entering surface, the range in which the light is diffused inside the light guide plates 302, 304, and 306 can be limited. As a result, the difference in luminance distribution from the exiting surface can be suppressed regardless of the positions of the exiting surfaces of the light guide plates 302, 304, and 306.

Note that the cross-sectional shape of the grooves 362, the number of the grooves 362 formed on the light guide plates 302, 304, and 306 (the spacing between adjacent grooves 362), and the width and depth of the grooves 362 are appropriately designed. Thus, the grooves 362 are not limited to those described in FIGS. 7A and 7B as long as the grooves 362 can reflect light which is diffused after entering.

Figure 9:
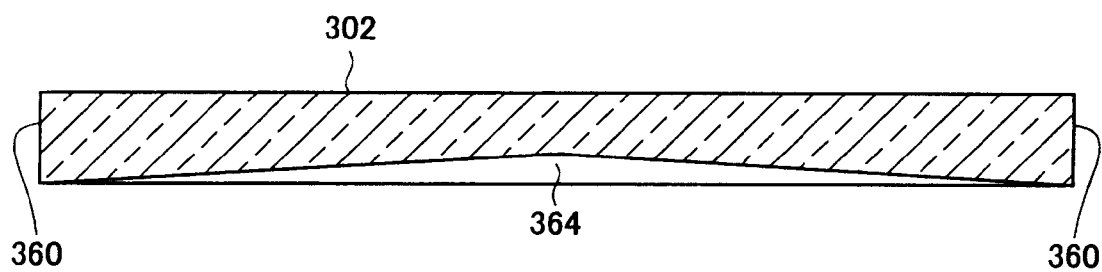
FIG. 9 is a cross-sectional view showing a first modification of the light guide plate 302 of the planar illumination apparatus 300 according to the third embodiment.

For example, the above-described grooves 362 have, as shown in FIG. 8, a constant depth regardless of the distance from a side end surface 360 through which light enters but the present invention is not limited to this example. For example, as shown in FIG. 9, the depth of a groove 364 may change from 0 to t, according to the distance from a side end surface 360. FIG. 9 is a cross-sectional view showing a first modification of the light guide plate 302 of the planar illumination apparatus 300 according to the present embodiment. In an area near an LED light source 110, the degree of light spread is small and thus grooves may not be formed or may be shallow. Then, to effectively suppress light spread in an area far from the LED light source 110, the depth of the grooves is deepened.

Figure 10:
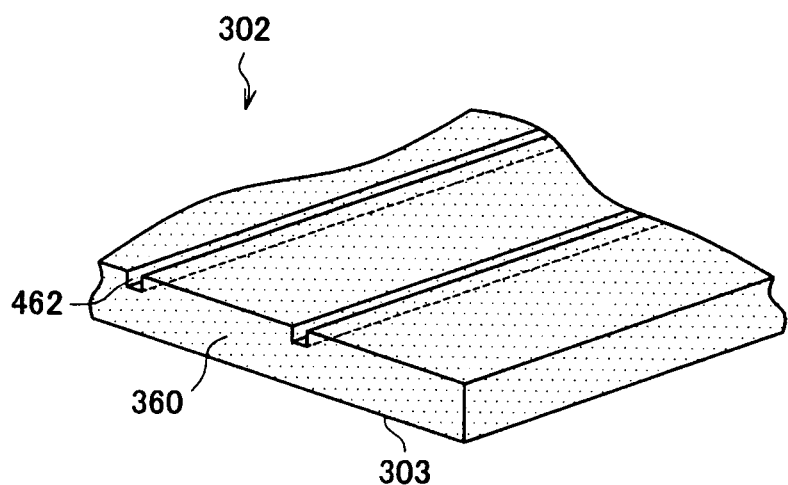
FIG. 10 is a cross-sectional view showing a second modification of the light guide plate 302 of the planar illumination apparatus 300 according to the third embodiment.

Although the above-described grooves 362 are formed on a surface of each of the light guide plates 302, 304, and 306 facing a light-exiting surface thereof and having formed thereon the diffuse reflection pattern 303, 305, or 307, the present invention is not limited to this example. For example, as shown in FIG. 10, grooves 462 may be formed on a surface that is the same as a light-exiting surface of each of the light guide plates 302, 304, and 306 and that faces a surface having formed thereon the diffuse reflection pattern 303, 305, or 307. FIG. 10 is a cross-sectional view showing a second modification of the light guide plate 302 of the planar illumination apparatus 300 according to the present embodiment. Though not shown, grooves may be formed on both surfaces, i.e., a surface that is the same as a light-exiting surface of each of the light guide plates 302, 304, and 306 and a surface facing the light-exiting surface.

Figure 11:
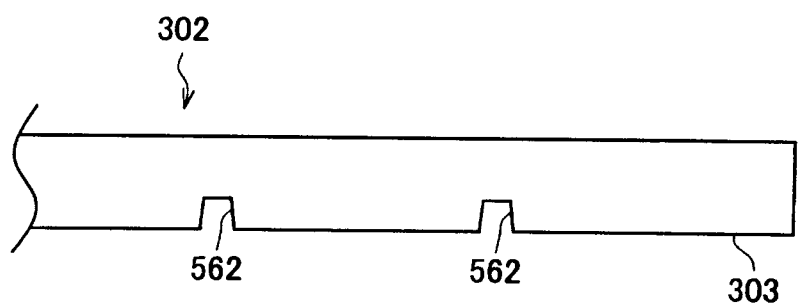
FIG. 11 is a partially enlarged cross-sectional view showing a third modification of the light guide plate 302 of the planar illumination apparatus 300 according to the third embodiment.

Furthermore, although the cross-sectional shape of the grooves 362 is shown in which the angle thereof is a right angle, the present invention is not limited to this example. For example, as shown in FIG. 11, the cross-sectional shape of grooves 562 may be trapezoidal. FIG. 11 is a partially enlarged cross-sectional view showing a third modification of the light guide plate 302 of the planar illumination apparatus 300 according to the present embodiment. By thus making an angle formed by a surface of each of the light guide plates 302, 304, and 306 and a rising surface of a groove 562 formed inside each of the light guide plates 302, 304, and 306, larger than 90° instead of a right angle, the brightness of light irradiated through an exiting surface can be made brighter. Note, however, that the above-described angle needs to be formed not too large, to prevent light from being diffused which loses the meaning of provision of grooves.

As described above, according to the present embodiment, luminance distributions of light through the exiting surfaces of the light guide plates 302, 304, and 306 can be brought close to constant without being changed according to the distances from the LED light sources 110. As a result, a uniform light emission characteristic can be obtained regardless of the positions of the exiting surfaces. Note that the grooves 362, 462, and 562 may be formed on all the light guide plates 302, 304, and 306 or may be formed only in one light guide plate. The advantage of grooves is to obtain equal light emission distributions regardless of the position and this effect can be achieved whether a light guide plate in which grooves are formed is made of a single layer or multiple layers. Note that, under constrains of an overall luminance distribution, light use efficiency as an apparatus, non-visibility which inhibits a stripe pattern in display from being visually recognized, etc., there may be a case in which a necessary and sufficient number of grooves may not be formed on one light guide plate. In this case, by allowing a light guide plate in which grooves are formed to have multiple layers, the probability of the presence of grooves can be increased, enabling to form a necessary number of grooves. This can be implemented in the case of light sources such as LEDs or can also be implemented in the case of light sources extending in one direction, such as CCFLs.

As described above, according to the first to third embodiments, the slimming down of a liquid crystal display apparatus or a planar illumination apparatus can be achieved and at the same time, the light-emitting area can be partially controlled. Furthermore, lighting can be performed on an area-by-area basis while a brightness/darkness distribution exhibits a gradual change. As a result, in a liquid crystal display apparatus, the contrast of a screen can be improved. In addition, in the embodiments, there is no need to make a significant change to the configuration of a conventional edge-lit type backlight scheme and thus there is no need to add special parts as in the case of Japanese Patent Application Laid-Open No. 11-288611 (U.S. Pat. No. 3,373,427). A liquid crystal display apparatus or a planar illumination apparatus according to the embodiments can be manufactured with a concise configuration and a reduction in cost can also be achieved.

It should be understood by those skilled in the art that various modifications, combinations, sub-combinations and alterations may occur depending on design requirements and other factors insofar as they are within the scope of the appended claims or the equivalents thereof.

For example, although in the above-described embodiments the light sources are LED light sources, the present invention is not limited to this example. For example, one or a plurality of cold cathode fluorescent lamps (CCFLs) may be used.

In addition, although a planar illumination apparatus is applied to a liquid crystal display apparatus, the present invention is not limited to this example. For example, a planar illumination apparatus may be applied to other display apparatuses than liquid crystal display apparatuses.

In addition, although an example of section areas on which lighting control is performed is shown in FIG. 5, the present invention is not limited to this example. The number and area of section areas may differ from those shown in the example in FIG. 5. Furthermore, although the top/bottom relationship between diffuse reflection patterns is described using FIGS. 3A to 3C, the present invention is not limited to this example. For example, the same pattern as the diffuse reflection pattern 103 may be formed on the light guide plate 104 in the intermediate layer, and the same pattern as the diffuse reflection pattern 105 may be formed on the light guide plate 102 in the top layer.

Furthermore, although in the embodiments the case is described in which a pattern formed in a diffuse reflection pattern differs between layers, the present invention is not limited to this example. Diffuse reflection patterns in the respective layers may be the same to provide the same light emission distribution for all the layers. As a result, by lighting control of the light sources by the control unit, some of a plurality of areas can be controlled minutely. For example, when only the screen in a vertical direction is divided (the screen is divided into n rows), the ON/OFF of rows a and b can be controlled by ON/OFF of the light sources. Furthermore, by ON/OFF control of the light sources on a layer-by-layer basis, minute brightness resolution can be obtained, enabling to improve brightness resolution. In another example, for the colors of the light sources for the respective layers, for example, three colors, red, green, and blue, are used. Then, by performing ON/OFF control of the light sources on a layer-by-layer basis, the color of light emission can be controlled. In addition, by ON/OFF control of the light sources, brightness control of some areas can be performed. That is, a local color dimming function can be added.

In addition, although in the embodiments the case in which three light guide plates are provided is described, two or less light guide plates may be used or four or more light guide plates may be used. For example, there may be a case in which a single light guide plate is provided and only luminance distributions with two peaks are obtained by means of a diffuse reflection pattern.

The present application contains subject matter related to that disclosed in Japanese Priority Patent Application JP 2009-164052 filed in the Japan Patent Office on Jul. 10, 2009, the entire content of which is hereby incorporated by reference.

What is claimed is:

1. A display apparatus comprising:
a plurality of transparent plates which are disposed to be superimposed and which allow entered light to pass therethrough and allow the light to exit through an exiting surface;
light sources provided for the respective transparent plates to irradiate light onto a side end surface of each of the transparent plates;
a plurality of diffusion portions, each of which is formed on a surface of each of the transparent plates facing the exiting surface, and which diffuse light from the light sources such that a position of maximum luminance of light exiting from each of the transparent plates differs between the transparent plates; and
a reflector between the transparent plates, the reflector reflecting light so that light from a corresponding one of the light sources which perform irradiation on their corresponding transparent plates does not leak into another transparent plate.

2. The display apparatus according to claim 1, further comprising:
a reflective member which is disposed adjacent to one of the plurality of diffusion portions disposed on a surface that is most distanced from the exiting surface, and which reflects entered light,
wherein
the one of the plurality of diffusion portions disposed on the surface that is most distanced from the exiting surface diffuses light such that the light exits through an area surface of the exiting surface near the light sources.

3. The display apparatus according to claim 1, wherein when light is irradiated onto all the transparent plates from the light sources, light to exit through the exiting surface is uniform over the entire exiting surface.

4. A display apparatus comprising:
a plurality of transparent plates which are disposed to be superimposed and which allow entered light to pass therethrough and allow the light to exit through an exiting surface;
light sources provided for the respective transparent plates to irradiate light onto a side end surface of each of the transparent plates;
a plurality of diffusion portions, each of which is formed on a surface of each of the transparent plates facing the exiting surface, and which diffuse light from the light sources;
a reflector between the transparent plates, the reflector reflecting light so that light from a corresponding one of the light sources which perform irradiation on their corresponding transparent plates does not leak into another transparent plate; and
a control unit that performs lighting control of the light sources such that the light exiting through the exiting surface exits from one or a plurality of areas among a plurality of areas created by dividing the entire exiting surface into a plurality of sections.

5. A display apparatus comprising:
a plurality of transparent plates which are disposed to be superimposed and which allow entered light to pass therethrough and allow the light to exit through an exiting surface;
light sources provided for the respective transparent plates to irradiate light onto a side end surface of each of the transparent plates; and
a plurality of diffusion portions, each of which is formed on a surface of each of the transparent plates facing the exiting surface, and which diffuse light from the light sources,
wherein
a plurality of linear grooves is formed on one surface or both surfaces of each of the transparent plates in a same direction as a direction in which light from the light sources enters, wherein a cross-sectional shape of the grooves is rectangular.

6. A display apparatus comprising:
a plurality of transparent plates which are disposed to be superimposed and which allow entered light to pass therethrough and allow the light to exit through an exiting surface;
light sources provided for the respective transparent plates to irradiate light onto a side end surface of each of the transparent plates; and
a plurality of diffusion portions, each of which is formed on a surface of each of the transparent plates facing the exiting surface, and which diffuse light from the light sources,
wherein
a plurality of linear grooves is formed on one surface or both surfaces of each of the transparent plates in a same direction as a direction in which light from the light sources enters, wherein the grooves are formed such that a depth thereof changes according to a distance from the light sources.

7. A display apparatus comprising:
a plurality of transparent plates which allow entered light to pass therethrough and allow the light to exit through an exiting surface;
light sources provided for the respective transparent plates to irradiate light onto a side end surface of each of the transparent plates;
a plurality of diffusion portions, each of which is formed on a surface of each of the transparent plates facing the exiting surface, and which diffuse light from the light sources such that a position of maximum luminance of light exiting from each of the transparent plates differs between the transparent plates; and
a reflector between the transparent plates, the reflector reflecting light so that light from a corresponding one of the light sources which perform irradiation on their corresponding transparent plates does not leak into another transparent plate,
wherein
the light sources are disposed facing each other to irradiate light onto two side end surfaces of each of the transparent plates in a facing relationship, and
in each of the diffusion portions, a position of maximum luminance of light exiting from a corresponding transparent plate after light entering from a corresponding light source through one of two side end surfaces is diffused, differs from a position of maximum luminance of light exiting from the corresponding transparent plate after light entering from a corresponding light source through an other one of the two side end surfaces is diffused.

8. A planar illumination apparatus comprising:

a plurality of transparent plates which are disposed to be superimposed and which allow entered light to pass therethrough and allow the light to exit through an exiting surface;

light sources provided for the respective transparent plates to irradiate light onto a side end surface of each of the transparent plates;

a plurality of diffusion portions, each of which is disposed on a surface of each of the transparent plates facing the exiting surface, and which diffuse light from the light sources such that a position of maximum luminance of light exiting from each of the transparent plates differs between the transparent plates; and a reflector between the transparent plates, the reflector reflecting light so that light from a corresponding one of the light sources which perform irradiation on their corresponding transparent plates does not leak into another transparent plate.

* * * * *